United States Patent
Deshpande

(10) Patent No.: US 7,266,147 B2
(45) Date of Patent: Sep. 4, 2007

(54) HYPOTHETICAL REFERENCE DECODER

(75) Inventor: Sachin Govind Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 792 days.

(21) Appl. No.: 10/404,947

(22) Filed: Mar. 31, 2003

(65) Prior Publication Data

US 2004/0190606 A1   Sep. 30, 2004

(51) Int. Cl.
*H04B 1/66* (2006.01)

(52) U.S. Cl. .............................. 375/240.01

(58) Field of Classification Search ........... 375/240.01, 375/240.05, 240.16, 240.12, 240.15, 240.26, 375/240, 240.29, 240.25; 348/699, 419.1, 348/413; 382/234; *H04B 1/66*
See application file for complete search history.

(56) References Cited

U.S. PATENT DOCUMENTS

| | | | |
|---|---|---|---|
| 5,159,447 A * | 10/1992 | Haskell et al. ......... | 375/240.05 |
| 5,481,543 A | 1/1996 | Veltman | |
| 5,537,408 A | 7/1996 | Branstad et al. | |
| 5,619,341 A * | 4/1997 | Auyeung et al. ........... | 358/404 |
| 5,629,736 A | 5/1997 | Haskett et al. | |
| 5,652,749 A | 7/1997 | Davenport et al. | |
| 5,831,688 A * | 11/1998 | Yamada et al. .............. | 348/699 |
| 5,995,151 A * | 11/1999 | Naveen et al. ......... | 375/240.24 |
| 6,272,566 B1 | 8/2001 | Craft | |
| 6,389,072 B1 * | 5/2002 | Tzou et al. .................. | 375/240 |
| 6,542,549 B1 * | 4/2003 | Tan et al. .............. | 375/240.26 |
| 6,909,743 B1 * | 6/2005 | Ward et al. ............ | 375/240.01 |
| 6,912,251 B1 * | 6/2005 | Ward et al. .................. | 375/240 |
| 2003/0053416 A1 | 3/2003 | Ribas-Corbera et al. | |

FOREIGN PATENT DOCUMENTS

EP   0 930 786   7/1999

OTHER PUBLICATIONS

Jordi Ribas-Corbera, Philip A. Chou, and Shankar Regunathan, "A Flexible Decoder Buffer Model for JVT Video Coding," International Conference on Image Processing ICIP 2002, vol. 2, Sep. 22, 2002 pp. II-493-II-496.

"Annex C—Video Buffering Verifier, Information Technology—Generic coding of moving pictures and associated audio information: Video," ITU-T Recommendation H.262, Feb. 2000, pp. 1, 138-142, XP 002 248 658.

"Annex B—Hypothetical Reference Decoder, Video Coding for Low Bit Rate Communication," ITU-T Recommendation H.263, Feb. 1998, pp. 1, 49-50, XP 002 248 657.

Jordi Ribas-Corbera, "A Generalized Hypothetical Reference Decoder for H.264/AVC," IEEE Transactions on Circuits and Systems for Video Technology, IEEE Service Center, Piscataway, NJ, US, vol. 13, No. 7 Jul. 2003, pp. 674-687, XP 001 051 195.

Ribas-Corbera et al., "A Generalized Hypothetical Reference Decoder for H.26L," ITU Telecommunications Standardization Sector, Sep. 24-27, 2001.

(Continued)

*Primary Examiner*—Tung Vo
(74) *Attorney, Agent, or Firm*—Chernoff, Vilhauer, McClung & Stenzel

(57) ABSTRACT

A hypothetical reference decoder.

11 Claims, 5 Drawing Sheets

OTHER PUBLICATIONS

Ribas-Corbera et al., "A Flexible Decoder Buffer Model for JVT Video Coding,".

Shankar L. Regunathan, Phil A. Chou, Jordi Ribas-Corbera; *Video Complexity Verifier for HRD*; Microsoft, JVT-BO50, Jan. 18, 2002, pp. 1-19.

Misska M. Hannuksela; *Simple Definition of GOP for Random Access*; Nokia Corporation, JVT-BO41, Jan. 23, 2002, pp. 1-6.

Miska M. Hannuksela, Stephan Wenger, Thomas Stockhammer; *Random Access and Time Information*; JVT-B109, Mar. 1, 2002, pp. 1-6.

Gary Sullivan; *On Random Access and Bitstream Format for JVT Video*;Microsoft Corporation, JVT-B063R1, pp. 1-16.

Eric Viscito; *H.26L Buffering Ad-hoc Group Report*; Globespan Virata, ITU Sector Member, JVT-B013, Jan. 23, 2002, pp. 1-3.

Annex C, *Hypothetical Reference Decoder*; Draft ISO/IEC 14496-10:2002(E), Draft ITU-T Rec. H.2649, (2002)E, pp. 160-188.

Annex D, *Features supported by the Algorithm*, ITU-T Rec. H.262 (1995 E), pp. 148-150.

Annex C, *Video Buffering Verifier*; H.262/MPEG-2, ITU-T Rec. H.262 (1995E), pp. 143-147.

"Working Draft No. 2, Revision 3 (WD-2r3)," Joint Video Team (JVT) of ISO/IEC MPEG and ITU-T VCEG, Gary Sullivan, One Microsoft Way, Redmond, WA 98052 USA, Mar. 25, 2002, Dovument JVT-B118r3, 99 pages.

* cited by examiner

HYPOTHETICAL REFERENCE DECODER

BACKGROUND OF THE INVENTION

The present invention relates to a hypothetical reference decoder.

A digital video system includes a transmitter and a receiver which assemble video comprising audio, images, and ancillary components for coordinated presentation to a user. The transmitter system includes subsystems to receive and compress the digital source data (the elementary or application data streams representing a program's audio, video, and ancillary data components); multiplex the data from the several elementary data streams into a single transport bit stream; and transmit the data to the receiver. At the receiver the transport bit stream is demultiplexed into its constituent elementary data streams. The elementary data streams are decoded and the audio and video data streams are delivered as synchronized program elements to the receiver's presentation subsystem for display as parts of a coordinated program.

In many video coding standards, a complaint bit stream to the decoder is decoded by a hypothetical decoder that is conceptually connected to the output of an encoder and consists of a decoder buffer, a decoder, and a display unit. This virtual decoder is known as the hypothetical reference decoder (HRD) in H.263 and the video buffering verifier (VBV) in MPEG-2. The encoder creates a bit stream so that the hypothetical decoder buffer does not overflow or underflow.

As a result, the quantity of data the receiver may be required to buffer might exceed its capacity (a condition of memory overflow) or throughput capabilities. Alternatively, the receiver may fail to receive all of the data in a data access unit in time for decoding and synchronized presentation with a specified instant in the audio or video data streams resulting in a loss of data and inconsistent performance (a condition of memory underflow).

In existing hypothetical reference decoders, the video bit stream is received at a given constant bit rate (usually the average rate in bits/sec of the stream) and is stored into the decoder buffer until the buffer fullness reaches a desired level. Such a desired level is denoted as the initial decoder buffer fullness and is directly proportional to the transmission or start-up (buffer) delay. At that point, the decoder instantaneously removes the bits for the first video frame of the sequence, decodes the bits, and displays the frame. The bits for the following frames are also removed, decoded, and displayed instantaneously at subsequent time intervals.

Traditional hypothetical decoders operate at a fixed bit rate, buffer size, and initial delay. However, in many of today's video applications (e.g., video streaming through the Internet or ATM networks) the available bandwidth varies according to the network path (e.g., how the user connects to the network: by modem, ISDN, DLS, cable, etc.) and also fluctuates in time according to network conditions (e.g., congestion, the number of users connected, etc.). In addition, the video bit streams are delivered to a variety of devices with different buffer capabilities (e.g., hand-sets, PDAs, PCs, Set-top-boxes, DVD-like players, etc.) and are created for scenarios with different delay requirements (e.g., low-delay streaming, progressive download, etc.). As a result, these applications require a more flexible hypothetical reference decoder that can decode a bit stream at different peak bit rates, and with different buffer sizes and start-up delays.

Jordi Ribas-Corbera and Philip A. Chou in a paper entitled, "A Generalized Hypothetical Reference Decoder For H.26L", on Sep. 4, 2001, proposed a modified hypothetical reference decoder. The decoder operates according to N sets of rate and buffer parameters for a given bit stream. Each set characterizes what is known as a leaky bucket model and contains three values (R, B, F), where R is the transmission bit rate, B is the buffer size, and F is the initial decoder buffer fullness (F/R is the start-up or initial buffer delay). An encoder can create a video bit stream that is contained by some desired N leaky buckets, or can simply compute the N sets of parameters after the bit stream has been generated. The hypothetical reference decoder may interpolate among the leaky bucket parameters and can operate at any desired peak bit rate, buffer size, or delay. For example, given a peak transmission rate R', the reference decoder may select the smallest buffer size and delay (according to the available leaky bucket data) that will be able to decode the bit stream without suffering from buffer underflow or overflow. Conversely, for a given buffer size B', the hypothetical decoder may select and operate at the minimum required peak transmission rate.

There are benefits of using such a generalized hypothetical reference decoder. For example, a content provider can create a bit steam once, and a server can deliver it to multiple devices of different capabilities, using a variety of channels of different peak transmission rates. Or a server and a terminal can negotiate the best leaky bucket for the given networking conditions—e.g., the ones that will produce the lowest start-up (buffer) delay, or the one that will require the lowest peak transmission rate for the given buffer size of the device.

As described in Document VCEG-58 Sections 2.1-2.4, a leaky bucket is a model for the state (or fullness) of an encoder or decoder buffer as a function of time. The fullness of the encoder and the decoder buffer are complements of each other. A leaky bucket model is characterized by three parameters (R, B, F), where:

R is the peak bit rate (in bits per second) at which bits enter the decoder buffer. In constant to bit rate scenarios, R is often the channel bit rate and the average bit rate of the video clip.

B is the size of the bucket or decoder buffer (in bits) which smoothes the video bit rate fluctuations. This buffer size cannot be larger than the physical buffer of the decoding device.

F is the initial decoder buffer fullness (also in bits) before the decoder starts removing bits from the buffer. F and R determine the initial or start-up delay D, where D=F/R seconds.

In a leaky bucket model, the bits enter the buffer at rate R until the level of fullness is F (i.e., for D seconds), and then b0 bits for the first frame are instantaneously removed. The bits keep entering the buffer at rate R and the decoder removes b1, b2, . . . , bn−1 bits for the following frames at some given time instants, typically (but not necessarily) every 1/M seconds, where M is the frame rate of the video. FIG. 1 illustrates the decoder buffer fullness along time of a bit stream that is constrained in a leaky bucket of parameters (R, B, F).

Let Bi be the decoder buffer fullness immediately before removing $b_i$ bits at time $t_i$. A generic leaky bucket model operates according to the following equations:

$$B_0 = F$$

$$B_{i+1} = \min(B, B_i - b_i + R(t_{i+1} - t_i)), \quad i=0, 1, 2, \quad (1)$$

Typically, $t_{i+1}-t_i=1/M$ seconds, where M is the frame rate (normally in frames/sec) for the bit stream.

A leaky bucket model with parameters (R, B, F) contains a bit stream if there is no underflow of the decoder buffer. Because the encoder and decoder buffer fullness are complements of each other this is equivalent to no overflow of the encoder buffer. However, the encoder buffer (the leaky bucket) is allowed to become empty, or equivalently the decoder buffer may become full, at which point no further bits are transmitted from the encoder buffer to the decoder buffer. Thus, the decoder buffer stops receiving bits when it is full, which is why the min operator in equation (1) is included. A full decoder buffer simply means that the encoder buffer is empty.

The following observations may be made:

A given video stream can be contained in many leaky buckets. For example, if a video stream is contained in a leaky bucket with parameters (R, B, F), it will also be contained in a leaky bucket with a larger buffer (R, B', F), B'>B, or in a leaky bucket with a higher peak transmission rate (R', B, F), R'>R.

For any bit rate R', the system can always find a buffer size that will contain the (time-limited) video bit stream. In the worst case (R' approaches 0), the buffer size will need to be as large as the bit stream itself. Put another way, a video bit stream can be transmitted at any rate (regardless of the average bit rate of the clip) as long as the buffer size is large enough.

Assume that the system fixes F=aB for all leaky buckets, where a is some desired fraction of the initial buffer fullness. For each value of the peak bit rate R, the system can find the minimum buffer size $B_{min}$ that will contain the bit stream using equation (1). The plot of the curve of R-B values, is shown in FIG. 2.

By observation, the curve of $(R_{min}, B_{min})$ pairs for any bit stream (such as the one in FIG. 2) is piecewise linear and convex. Hence, if N points of the curve are provided, the decoder can linearly interpolate the values to arrive at some points $(R_{interp}, B_{interp})$ that are slightly but safely larger than $(R_{min}, B_{min})$. In this way, one is able to reduce the buffer size, and consequently also the delay, by an order of magnitude, relative to a single leaky bucket containing the bit stream at its average rate. Alternatively, for the same delay, one is able to reduce the peak transmission rate by a factor of four, or possibly even improve the signal-to-noise ratio by several dB.

MPEG Video Buffering Verifier (VBV)

The MPEG video buffering verifier (VBV) can operate in two modes: constant bit rate (CBR) and variable bit rate (VBR). MPEG-1 only supports the CBR mode, while MPEG-2 supports both modes.

The VBV operates in CBR mode when the bit stream is contained in a leaky bucket model of parameters (R, B, F) and:

$R=R_{max}$=the average bit rate of the stream.

The value of B is stored in the syntax parameter vbv_buffer_size using a special size unit (i.e., 16×1024 bit units).

The value of F/R is stored in the syntax element vbv_delay associated to the first video frame in the sequence using a special time unit (i.e., number of periods of a 90 KHz clock).

The decoder buffer fullness follows the following equations:

$B_0=F$ $$B_{i+1}=B_i-b_i+R_{max}/M, \quad i=0, 1, 2, \qquad (2)$$

The encoder must ensure that $B_i-b_i$ is always greater than or equal to zero while $B_i$ is always less than or equal to B. In other words, the encoder ensures that the decoder buffer does not underflow or overflow.

The VBV operates in VBR mode when the bit stream is constrained in a leaky bucket model of parameters (R, B, F) and:

$R=R_{max}$=the peak or maximum rate. $R_{max}$ is higher than the average rate of the bit stream.

F=B, i.e., the buffer fills up initially.

The value of B is represented in the syntax parameter vbv_buffer_size, as in the CBR case.

The decoder buffer fullness follows the following equations:

$B_0=B$ $$B_{i+1}=\min(B, B_i-b_i+R_{max}/M), \quad i=0, 1, 2, \qquad (3)$$

The encoder ensures that $B_i-b_i$ is always greater than or equal to zero. That is, the encoder must ensure that the decoder buffer does not underflow. However, in this VBR case the encoder does not need to ensure that the decoder buffer does not overflow. If the decoder buffer becomes full, then it is assumed that the encoder buffer is empty and hence no further bits are transmitted from the encoder buffer to the decoder buffer.

The VBR mode is useful for devices that can read data up to the peak rate $R_{max}$. For example, a DVD includes VBR clips where $R_{max}$ is about 10 Mbits/sec, which corresponds to the maximum reading speed of the disk drive, even though the average rate of the DVD video stream is only about 4 Mbits/sec.

Referring to FIG. 3A and 3B, plots of decoder buffer fullness for some bits streams operating in CBR and VBR modes, respectively, are shown.

Broadly speaking, the CBR mode can be considered a special case of VBR where $R_{max}$ happens to be the average rate of the clip.

H.263's Hypothetical Reference Decoder (HRD)

The hypothetic reference model for H.263 is similar to the CBR mode of MPEG's VBV previously discussed, except for the following:

The decoder inspects the buffer fullness at some time intervals and decodes a frame as soon as all the bits for the frame are available. This approach results in a couple of benefits: (a) the delay is minimized because F is usually just slightly larger than the number of bits for the first frame, and (b) if frame skipping is common, the decoder simply waits until the next available frame. The later is enabled in the low-delay mode of MPEG's VBV as well.

The check for buffer overflow is done after the bits for a frame are removed from the buffer. This relaxes the constraint for sending large I frames once in awhile, but there is a maximum value for the largest frame.

H.263's HRD can essentially be mapped to a type of low delay leaky bucket model.

Limitations of Previous Hypothetical Reference Decoders

Previously existing hypothetical reference decoders operate at only one point (R, B) of the curve in FIG. 2. As a result these decoders have the following drawbacks:

If the bit rate available in the channel R' is lower than R (e.g., this is common for Internet streaming and progressive download, or when an MPEG VBR clip needs to be transmitted at a rate lower than the peak), strictly speaking, the hypothetical decoder would not be able to decode the bit stream.

If the available bandwidth R' is larger than R (e.g., this is also common for Internet streaming, as well as for local playback), the previous hypothetical decoders could operate in the VBR mode and decode the bit stream. However, if more information on the Rate-Buffer curve were available, the buffer size and associated start-up delay required to decode the bit stream could be significantly reduced.

If the physical buffer size in a decoder device is smaller than B, the device will not be able to decode that bit stream.

If the buffer size is larger than B, the device will be able to decode the bit stream but the start-up delay will be the same.

More generally, a bit stream that was generated according to a leaky bucket (R, B, F) will not usually be able to be distributed through different networks of bit rate smaller than R, and to a variety of devices with buffer sizes smaller than B. Also, the start-up delay will not be minimized.

Generalized Hypothetical Reference Decoder (GHRD)

A generalized hypothetical reference decoder (GHRD) can operate given the information of N leaky bucket models, $$(R_1, B_1, F_1), (R_2, B_2, F_2), \ldots, (R_N, B_N, R_N), \quad (4)$$

each of which contains the bit stream. Without loss of generality, let us assume that these leaky buckets are ordered from smallest to largest bit rate, i.e., $R_i < R_{i+1}$. Lets also assume that the encoder computes these leaky buckets models correctly and hence $B_i < B_{i+1}$.

The desired value of N can be selected by the encoder. If N=1, the GHRD is essentially equivalent to MPEG's VBV. The encoder can choose to: (a) pre-select the leaky bucket values and encode the bit stream with a rate control that makes sure that all of the leaky bucket constraints are met, (b) encode the bit stream and then use equation (1) to compute a set of leaky buckets containing the bit stream at N different values of R, or (c) do both. The first approach (a) can be applied to live or on-demand transmission, while (b) and (c) only apply to on-demand.

The number of leaky buckets N and the leaky bucket parameters (4) are inserted into the bit stream. In this way, the decoder can determine which leaky bucket it wishes to use, knowing the peak bit rate available to it and/or its physical buffer size. The leaky bucket models in (4) as well as all the linearly interpolated or extrapolated models are available for use. FIG. 4 illustrates a set of N leaky bucket models and their interpolated or extrapolated (R, B) values.

The interpolated buffer size B between points k and k+1 follow the straight line:

$$B=\{(R_{k+1}-R)/(R_{k+1}-R_k)\}B_k+\{(R-R_k)/(R_{k+1}-R_k)\}B_{k+1}$$
$$R_k < R < R_{k+1}$$

Likewise, the initial decoder buffer fullness F can be linearly interpolated:

$$F=\{(R_{k+1}-R)/(R_{k+1}-R_k)\}F_k+\{(R-R_k)/(R_{k+1}-R_k)\}F_{k+1}$$
$$R_k < R < R_{k+1}$$

The resulting leaky bucket with parameters (R, B, F) contains the bit stream, because the minimum buffer size $B_{min}$ is convex in both R and F, that is, the minimum buffer size $B_{min}$ corresponding to any convex combination (R, F)=$a(R_k, F_k)+(1-a)(R_{k+1}, F_{k+1})$, 0<a<1, is less than or equal to $B=aB_k+(1-a)B_{k+1}$.

It is observed that if R is larger than $R_N$, the leaky bucket (R, $B_N$, $F_N$) will also contain the bit stream, and hence $B_N$ and $F_N$ are the buffer size and initial decoder buffer fullness recommended when $R>=R_N$. If R is smaller than R., the upper bound $B=B_1+(R_1-R)T$ can be caused (and once can set F=B), where T is the time length of the stream in seconds. These (R, B) values outside the range of the N points are also shown in FIG. 4.

The Joint Video Team of ISO/IEC MPEG and ITU-T VCEG Working Draft Number 2, Revision 0 (WD-2) incorporated many of the concepts of the hypothetical reference decoder proposed by Jordi Ribas-Cobera, et al. of Microsoft Corporation, incorporated by reference herein. The WD-2 document is similar to the decoder proposed by Jordi Ribas-Cobera, et al. of Microsoft Corporation, though the syntax is somewhat modified. In addition, WD-2 describes an example algorithm to compute B, and F for a given rate R.

DETAILED DESCRIPTION OF THE PREFERRED EMBODIMENT

As previously described, the JVT standard (WD-2) allows the storing of (N>=1) leaky buckets, $(R_1, B_1, F_1), \ldots, (R_N, B_N, F_N)$ values which are contained in the bit stream. These values may be stored in the header. Using $F_i$ as the initial buffer fullness and $B_i$ as the buffer size, guarantees that the decoder buffer will not underflow when the input stream comes in at the rate $R_i$. This will be the case if the user desires to present the encoded video from start to end. In a typical video-on-demand application the user may want to seek to different portions of the video stream. The point that the user desires to seek to may be referred to as the access point. During the process of receiving video data and constructing video frames the amount of data in the buffer fluctuates. After consideration, the present inventor came to the realization that if the $F_i$ value of the initial buffer fullness (when the channel rate is $R_i$) is used before starting to decode the video from the access point, then it is possible that the decoder will have an underflow. For example, at the access point or sometime thereafter the amount of bits necessary for video reconstruction may be greater than the bits currently in the buffer, resulting in underflow and inability to present video frames in a timely manner. It can likewise be shown that in a video stream the value of initial buffer fullness required to make sure there in no underflow at the decoder varies based on the point at which the user seeks to. This value is bounded by the $B_i$. Accordingly, the combination of B and F provided for the entire video sequence, if used for an intermediate point in the video will not likely be appropriate, resulting in an underflow, and thus freezing frames.

Figure 1:
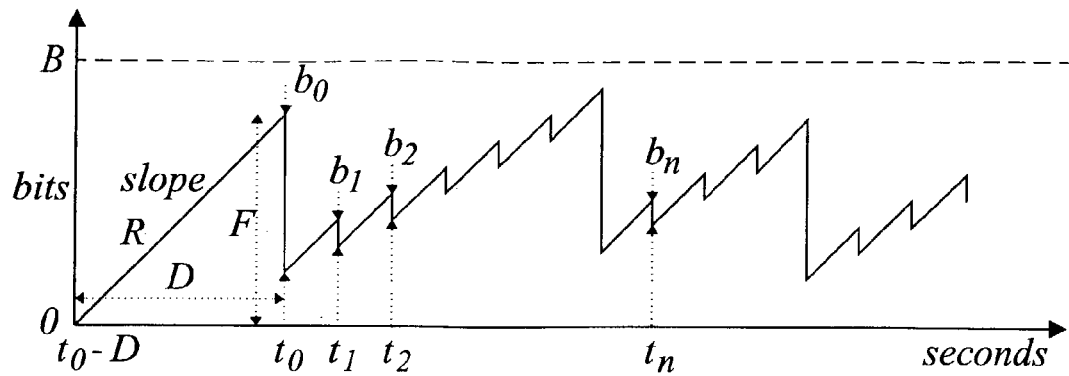
FIG. 1 illustrates decoder buffer fullness.
Figure 2:
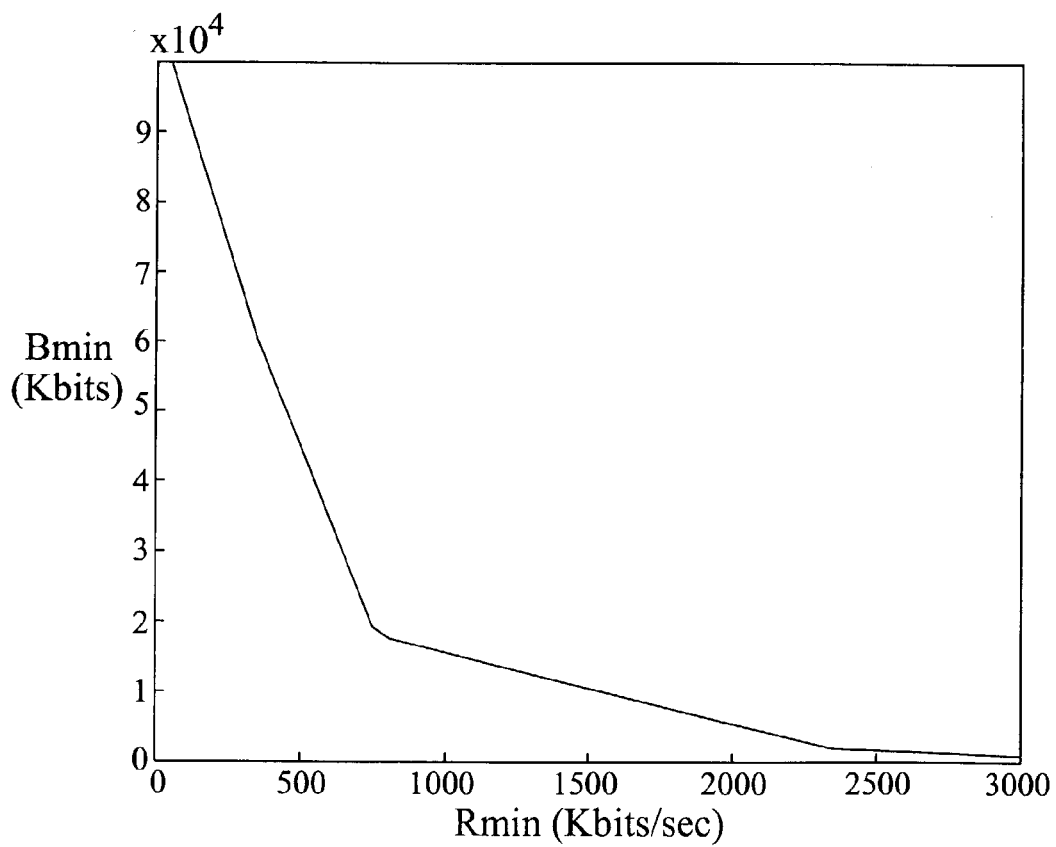
FIG. 2 illustrates a R-B curve.
Figure 3A:
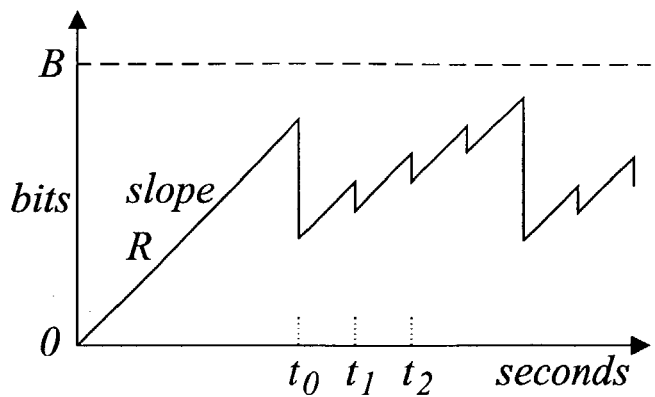
FIGS. 3A and 3B plots of decoder buffer fullness for some bits streams operating in CBR and VBR modes, respectively.
Figure 3B:
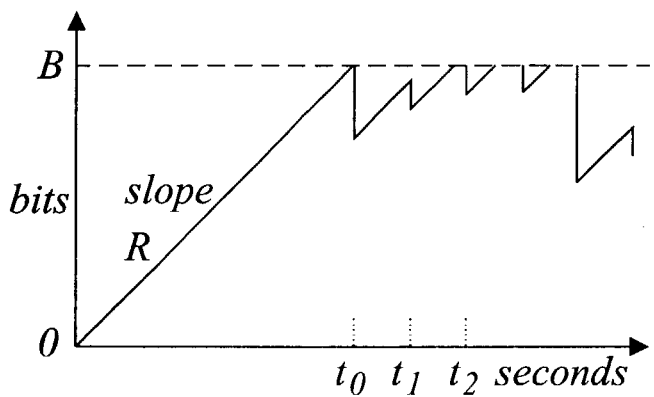
Figure 4:
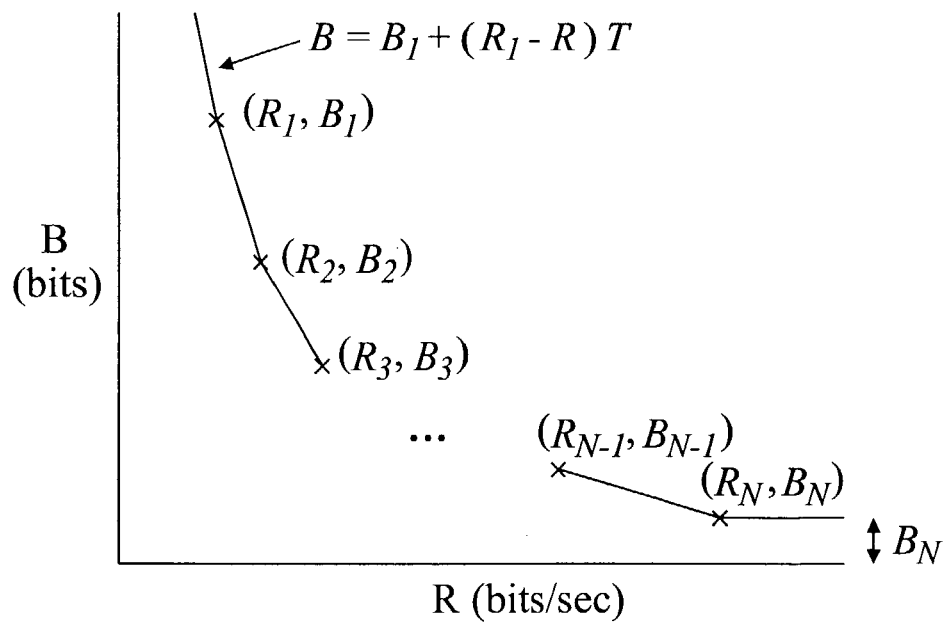
FIG. 4 illustrates a set of N leaky bucket models and their interpolated or extrapolated (R, B) values.
Figure 5:
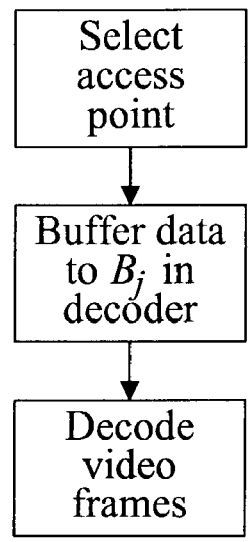
FIG. 5 initial buffering Bi for any point of the decoder the user seeks to when the rate is $R_j$.

Based upon this previously unrealized underflow potential, the present inventor then came to the realization that if only a set of R. B, and F values are defined for an entire video segment, then the system should wait until the buffer B for the corresponding rate R is full or substantially full (or greater than 90% full) to start decoding frames when a user jumps to an access point. In this manner, the initial fullness of the buffer will be at a maximum and thus there is no potential of underflow during subsequent decoding starting from the access point. This may be achieved without any additional changes to the existing bit stream, thus not impacting existing systems. Accordingly, the decoder would use the value of initial buffering $B_j$ for any point the user seeks to when the rate is $R_j$, as shown in FIG. 5. However, this unfortunately sometimes results in a significant delay until video frames are presented after selecting a different location (e.g., access point) from which to present video.

The initial buffer fullness (F) may likewise be characterized as a delay until the video sequence is presented (e.g., initial_cpb_removal_delay). The delay is temporal in nature being related to the time necessary to achieve initial buffer fullness (F). The delay and/or F may be associated with the entire video or the access points. It is likewise to be understood that delay may be substituted for F in all embodiments described herein (e.g., (R,B,delay)). One particular value for the delay may be calculated as delay=F/R, using a special time unit (units of 90 KHz Clock).

Figure 6:
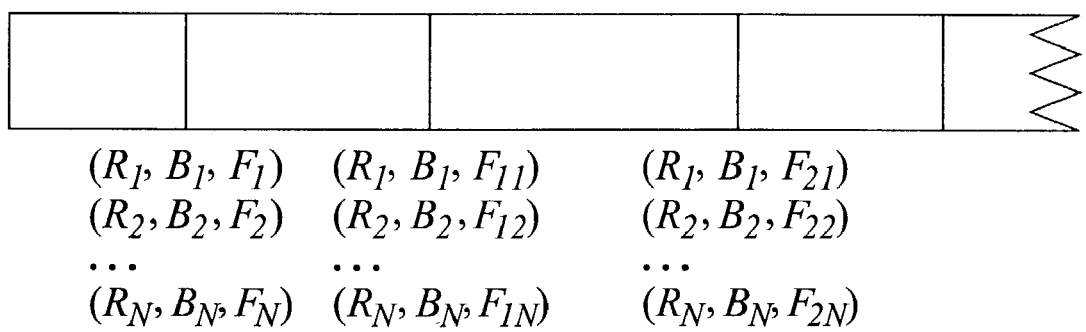
FIG. 6 illustrates sets of (R, B, F) defined in a forward looking fashion for the particular video stream.

To reduce the potential delay the present inventor came to the realization that sets of (R, B, F) may be defined for a particular video stream at each access point. Referring to FIG. 6, these sets of (R, B, F) are preferably defined in a forward looking fashion for the particular video stream. For example set of (R, B, F) values may be computed in the previously existing manner for the video stream as a whole, in addition, set of F values for the same (R, B) values as those for the whole video stream may be computed in the previously existing manner for the video stream with respect to the video stream from position "2" looking forward, etc. The same process may be used for the remaining access points. The access points may be any frame within the video sequence, I frames of the sequence, B frames of the sequence, or P frames of the sequence (I, B, and P frames are typically used in MPEG based video encoding). Accordingly, the user may select one of the access points and thereafter use the respective $F_{ij}$ for the desired initial fullness (assuming that the buffer $B_j$ and rate $R_j$ remain unchanged) or otherwise a set of two or more of $R_i$, $B_i$, $F_{ij}$.

The sets of R, B, F values for each access point may be located at any suitable location, such as for example, at the start of the video sequence together with sets of (R, B, F) values for the entire video stream or before each access point which avoids the need for an index; or stored in a manner external to the video stream itself which is especially suitable for a server/client environment.

This technique may be characterized by the following model:

$$(R_1, B_1, F_1, M_1, f_{11}, t_{11}, \ldots, f_{M11}, t_{M11}) \ldots, (R_N, B_N, F_{1N}, M_{1N}, f_{1N}, t_{1N}, \ldots, F_{MNN}, t_{MNN}),$$

where $f_{kj}$ denotes the initial buffer fullness value at rate $R_j$ at access point $t_{kj}$ (time stamp). The values of $M_j$ may be provided as an input parameter or may be automatically selected.

For example, $M_j$ may include the following options:
 (a) $M_j$ may be set equal to the number of access points. In this manner the values of $f_{kj}$ may be stored for each access point at each rate $R_j$ (either at the start of the video stream, within the video stream, distributed through the video stream, or otherwise in any location).
 (b) $M_j$ may be set equal to zero if no seekability support is desired.
 (c) $M_j$ values for each rate $R_j$ may be automatically selected (described later).

The system may, for a given $R_j$, use an initial buffer fullness equal to $f_{jk}$ if the user seeks an access point $t_{kj}$. This occurs when the user selects to start at an access point, or otherwise the system adjusts the user's selection to one of the access points.

It is noted that in the case that a variable bit rate (in bit stream) is used the initial buffer fullness value (or delay) is preferably different than the buffer size, albeit it may be the same. In the case of variable bit rate in MPEG-2 VBV buffer is filled till it is full, i.e. F=B (value of B is represented by vbv_buffer_size).

If the system permits the user to jump to any frame of the video in the manner of an access point, then the decoding data set would need to be provided for each and every frame. While permissible, the resulting data set would be excessively large and consume a significant amount of the bitrate available for the data. A more reasonable approach would be to limit the user to specific access points within the video stream, such as every second, 10 seconds, 1 minute, etc. While an improvement, the resulting data set may still be somewhat extensive resulting in excessive data for limited bandwidth devices, such as mobile communication devices.

In the event that the user selects a position that is not one of the access points with an associated data set, then the initial buffer fullness may be equal to $\max(f_{kj}, f_{(k+1)j})$ for a time between $t_{kj}$ and $t_{(k+1)j}$, especially if the access points are properly selected. In this manner, the system is guaranteed of having a set of values that will be free from resulting in an underflow condition, or otherwise reduce the likelihood of an underflow condition, as explained below.

Figure 7:
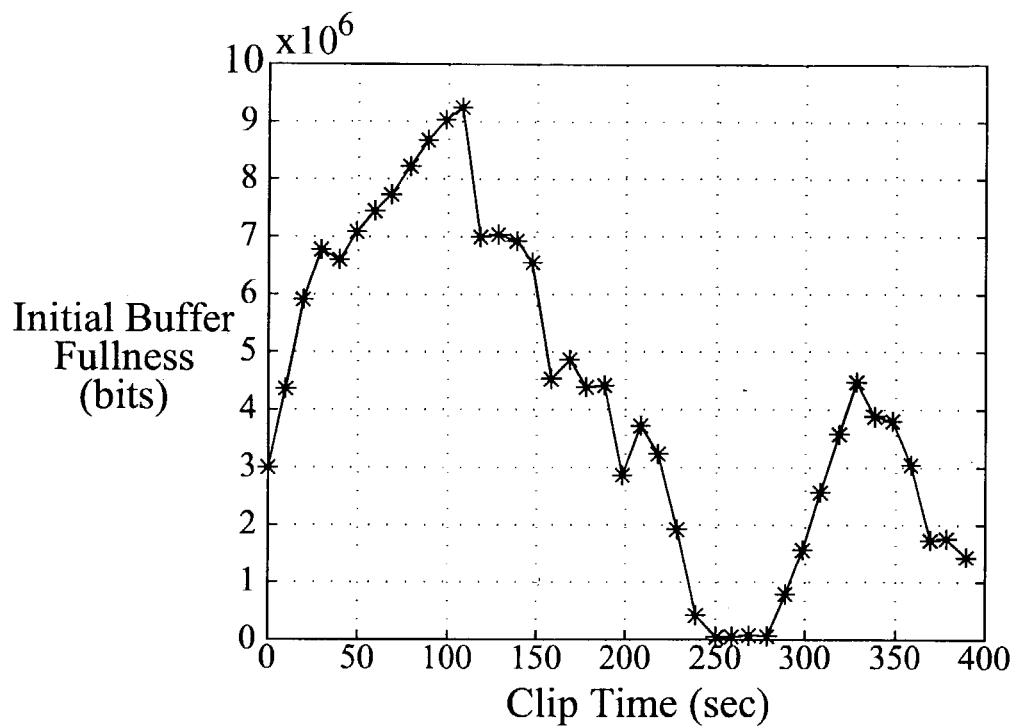
FIG. 7 illustrates the initial buffer fullness (in bits) for a video segment.

To select a set of values that will ensure no underflow condition (or otherwise reduce) when the above-referenced selection criteria is used, reference is made to FIG. 7. FIG. 7 illustrates the initial buffer fullness (in bits) for a video segment, where the forwarding looking initial buffer fullness is calculated for 10 second increments. Then the system preferably selects an access point at the start of the video sequence and an access point at the end of the video segment. Between the start and the end of the video segment, the system selects the local maximums to include as access points. Also, the system may select the local minimums to include as access points. Preferably, if a limited set of access points are desired the system first selects the local maximums, then the local minimums, which helps to ensure no underflow. Thereafter, the system may further select intermediate points, as desired.

Figure 8:
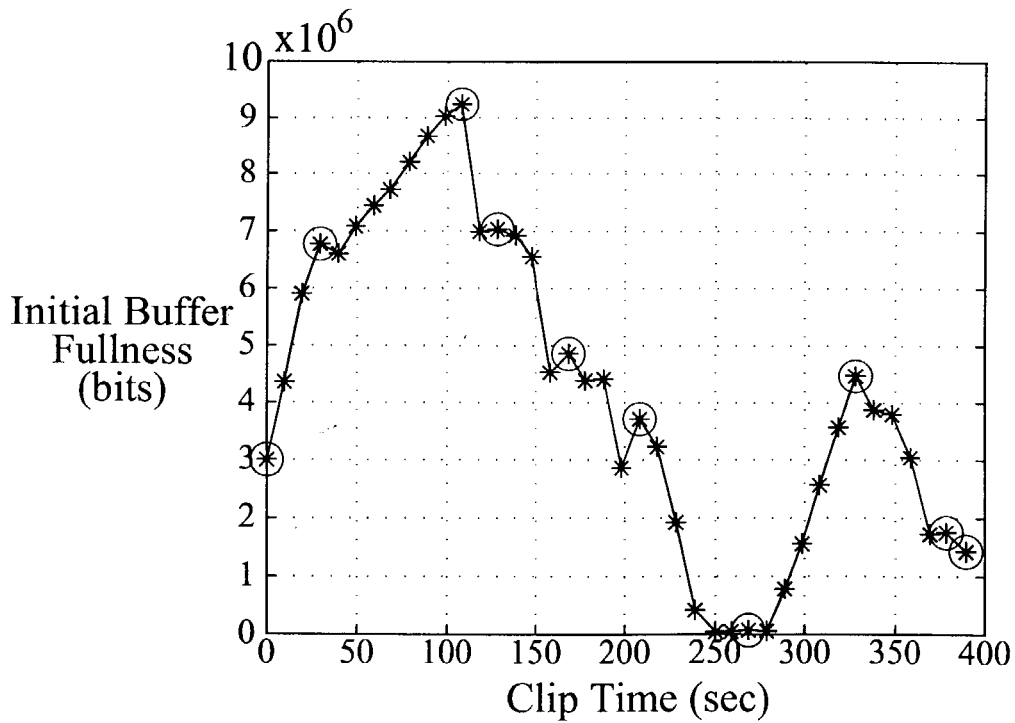
FIG. 8 illustrates the selection criteria a set of 10 points for FIG. 7.
Figure 9:
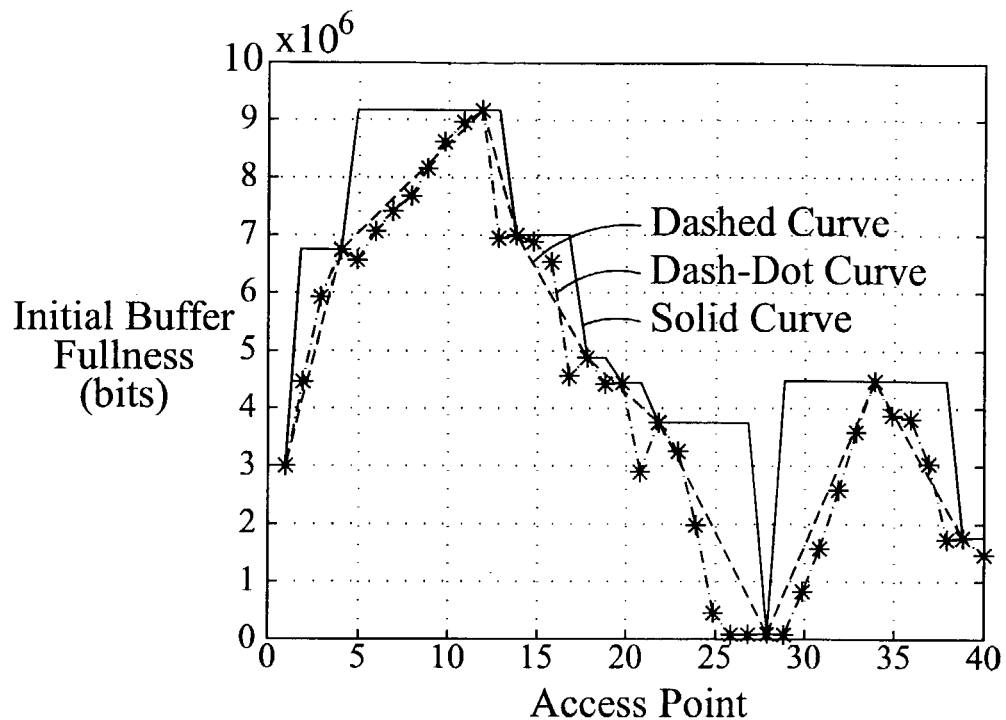
FIG. 9 illustrates selection criteria.

Based upon the selection criteria a set of 10 points for FIG. 7 may be selected as indicated in FIG. 8. Referring to FIG. 9, the 10 selected points are shown by the dashed curve.

Figure 10:
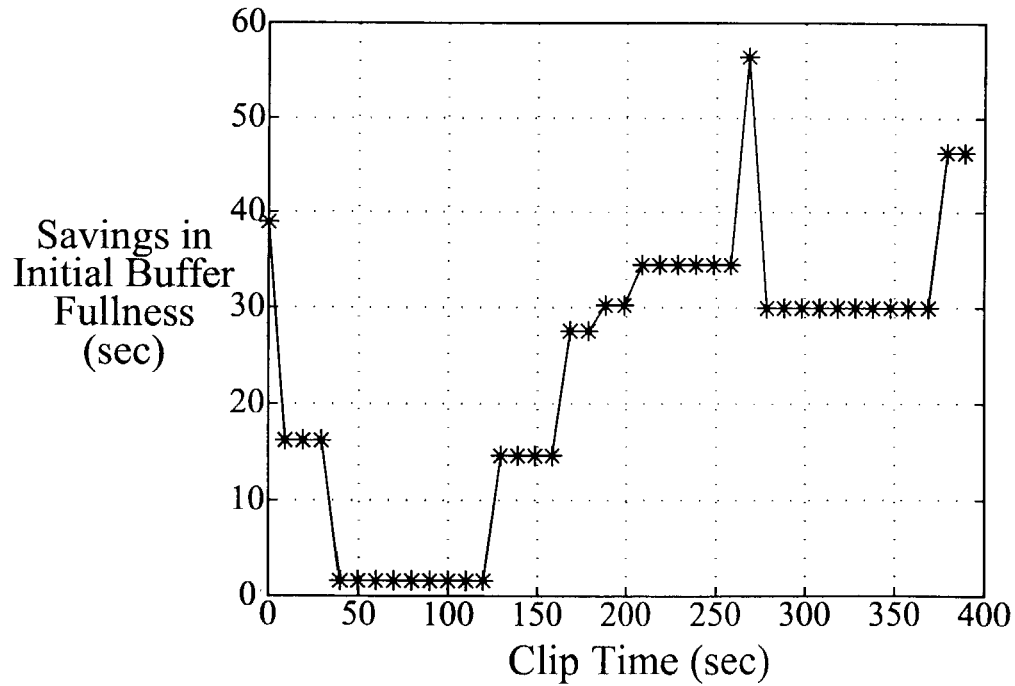
FIG. 10 illustrate delay reductions.

The resulting initial buffer fullness values at all access points are shown by the solid curve. The solid curve illustrates a "safe" set of values for all points in the video so that the decoder buffer will not underflow If extreme fluctuations occurred in the bit rate of the actual bit stream that were not detected in the processing, such as a sharp spike, then it is possible to result in an underflow, through normally unlikely. The optimal initial buffer fullness values at all access points are shown by the dash-dotted curve. A significant reduction in the buffering time delay is achieved, in contrast to requiring a full buffer when accessing an access point, as illustrated in FIG. 10.

In addition, if the bit rate and the buffer size remain the same while selecting a different access point, then merely the modified buffer fullness, F, needs to be provided or otherwise determined.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method comprising:
   (a) defining a first set of at least one value characteristic of a transmission bit rate for a first segment of a video having an associated first segment presentation start time and an associated first segment presentation end time;
   (b) defining a second set of at least one value characteristic of a buffer size for said first segment;
   (c) defining a third set of at least one value characteristic of an initial decoder buffer fullness for said first segment;
   (d) wherein each value within said first set, said second set, and said third set, respectively, is defined so that data received by a decoder for constructing a plurality of video frames of said first segment is free from an underflow state in a buffer of said decoder when said constructing begins at said first segment presentation start time;
   (e) defining a fourth set of at least one value characteristic of said transmission bit rate for a second segment of said video having an associated second segment presentation start time and an associated second segment presentation end time, said second segment presentation start time being later than first segment presentation start time and said second segment presentation end time being the same as, or earlier, than said first segment presentation end time;
   (f) defining a fifth set of at least one value characteristic of said buffer size for said second segment;
   (g) defining a sixth set of at least one value characteristic of said initial decoder buffer fullness for said second segment;
   (h) wherein each value within said fourth set, said fifth set, and said sixth set, respectively, is defined so that data received by said decoder for constructing a plurality of video frames of said second segment is free from an underflow state in said buffer of said decoder when said constructing begins at said second segment presentation start time; and
   (i) allowing a user to begin presentation at a user-selected one of said first segment presentation start time, and said second segment presentation start time associated with said second segment.

2. The method of claim 1 wherein said first set, second set, and third set of respective values together define at least one leaky bucket model for a buffer of a hypothetical reference decoder.

3. The method of claim 1 wherein said second segment presentation start time corresponds to a local maximum buffer fullness state of a said leaky bucket model constructed using values defined for said first segment of said video.

4. The method of claim 2 wherein said at least one leaky bucket model uses a fixed transmission bit rate.

5. The method if claim 2 wherein said at least one leaky bucket model uses a variable transmission bit rate.

6. The method of claim 1 including defining further respective sets of at least one value characteristic of a transmission bit rate, a buffer size, and an initial buffer fullness, respectively, each respective further set associated with another respective segment of said video having a presentation start time later than said second segment presentation start time, and a presentation end time the same as, or earlier, than said first segment presentation end time.

7. The method of claim 1 wherein steps (a) through (h) are performed at an encoder having a buffer fullness state complementary to said buffer of said decoder.

8. The method of claim 2 wherein said sixth set of at least one value is at least 90% of the buffer size of said at least one leaky bucket model.

9. The method of claim 1 wherein said fourth set of at least one value equals said first set of at least one value.

10. The method of claim 1 wherein said fifth set of at least one value equals said second set of at least one value.

11. The method of claim 1 wherein said sixth set of at least one value equals said third set of at least one value.

* * * * *

UNITED STATES PATENT AND TRADEMARK OFFICE
CERTIFICATE OF CORRECTION

PATENT NO. : 7,266,147 B2
APPLICATION NO. : 10/404947
DATED : September 4, 2007
INVENTOR(S) : Deshpande It is certified that error appears in the above-identified patent and that said Letters Patent is hereby corrected as shown below:

Col. 1, line 22
Change "a complaint bit stream" to --a compliant bit stream--.

Col. 1, line 56
Change "DLS" to --DSL--.

Col. 2, line 25
Change "steam" to --stream--.

Col. 2, line 61
Change "Bi" to --$B_i$--.

Col. 2, line 62
Change "b," to --$b_i$--.

Col. 2, line 67
Change "$B_{i+1} = \min(B, B_i - b_{i+R}(t_{i+1} - t_i)), i = 0,1,2,\ldots$"
to --$B_{i+1} = \min(B, B_i - b_i + R(t_{i+1} - t_i)), i = 0,1,2,\ldots$--.

Col. 4, line 1
Change "$B_{i+1} = B_i - b_i + R_{max}/M, i = 0,1,2,$"
to --$B_{i+1} = B_i - b_i + R_{max}/M, i = 0,1,2,\ldots$--.

Col. 4, line 19
Change "$B_{i+1} = \min(B, B_i - b_i + R_{max}/M), i = 0,1,2,$"
to --$B_{i+1} = \min(B, B_i - b_i + R_{max}/M), i = 0,1,2,\ldots$--.

Col. 4, line 36
Change "bits streams" to --bit streams--.

Col. 4, line 53
Change "later" to --latter--.

Col. 5, line 38
Change "$Ri <_{i+1}$" to --$R_i <_{i+1}$--.

Col. 6, line 30
Change "3A and 3B plots" to --3A and 3B illustrate plots--.

UNITED STATES PATENT AND TRADEMARK OFFICE
CERTIFICATE OF CORRECTION

PATENT NO. : 7,266,147 B2
APPLICATION NO. : 10/404947
DATED : September 4, 2007
INVENTOR(S) : Deshpande It is certified that error appears in the above-identified patent and that said Letters Patent is hereby corrected as shown below:

Col. 6, lines 31-32
Change "bits streams operating in CBR and VBR modes, respectively," to --bit streams operating in CBR and VBR modes, respectively.--.

Col. 6, line 35
Change "FIG. 5 initial buffering Bi" to --FIG. 5 illustrates initial buffering $B_j$--.

Col. 6, line 41
Change "selection criteria a set of 10 points" to --selection criteria of a set of 10 points--.

Col. 6, line 44
Change "illustrate delay" to --illustrates delay--.

Col. 7, line 14
Change "R." to --R,--.

Col. 7, line 46
Change "addition, set of F values" to --addition, a set of F values--.

Col. 8, lines 1 - 2
Change
"$(R_1, B_1, F_1, M_1, f_{11}t_{11}, ..., f_{M11}, t_{M11}) ..., (R_N, B_N, F_{1N}, M_{1N}, f_{1N t1N}, ..., F_{MNN}, t_{MNN}),$"

-- $(R_1, B_1, F_1, M_1, f_{11}t_{11}, ..., f_{M11}, t_{M11}) ..., (R_N, B_N, F_N, M_N, f_{1N}t_{1N}, ..., f_{MNN}, t_{MNN}),$ --

UNITED STATES PATENT AND TRADEMARK OFFICE
CERTIFICATE OF CORRECTION

PATENT NO. : 7,266,147 B2
APPLICATION NO. : 10/404947
DATED : September 4, 2007
INVENTOR(S) : Deshpande It is certified that error appears in the above-identified patent and that said Letters Patent is hereby corrected as shown below:

<u>Col. 9, line 4</u>
Change "underflow If" to --underflow. If--.

<u>Col. 10, line 28</u>
Change "The method if claim 2" to --The method of claim 2--.

Signed and Sealed this

Twenty-seventh Day of May, 2008

JON W. DUDAS
*Director of the United States Patent and Trademark Office*